US007035520B2

(12) United States Patent
Iwanek

(10) Patent No.: US 7,035,520 B2
(45) Date of Patent: Apr. 25, 2006

(54) SPLICING CASSETTE MANAGEMENT SYSTEM

(75) Inventor: Waldemar Iwanek, Dortmund (DE)

(73) Assignee: CCS Technology, Inc., Wilmington, DE (US)

( * ) Notice: Subject to any disclaimer, the term of this patent is extended or adjusted under 35 U.S.C. 154(b) by 0 days.

(21) Appl. No.: 10/500,170

(22) PCT Filed: Nov. 28, 2002

(86) PCT No.: PCT/EP02/13421

§ 371 (c)(1),
(2), (4) Date: Jun. 23, 2004

(87) PCT Pub. No.: WO03/056375

PCT Pub. Date: Jul. 10, 2003

(65) Prior Publication Data

US 2005/0078929 A1     Apr. 14, 2005

(30) Foreign Application Priority Data

Jan. 3, 2002    (DE)  .......................... 202 00 065 U

(51) Int. Cl.
*G02B 6/00*    (2006.01)
(52) U.S. Cl. ...................................... 385/135; 385/134
(58) Field of Classification Search ............... 385/135
See application file for complete search history.

(56) References Cited

U.S. PATENT DOCUMENTS

| 4,595,255 A | | 6/1986 | Bhatt et al. ................. 350/96.2 |
| 4,948,220 A | * | 8/1990 | Violo et al. .................... 385/55 |
| 5,142,607 A | * | 8/1992 | Petrotta et al. ............. 385/135 |
| 5,335,349 A | * | 8/1994 | Kutsch et al. .............. 375/257 |
| 6,178,282 B1 | | 1/2001 | Moribe et al. .............. 385/134 |
| 6,249,632 B1 | * | 6/2001 | Wittmeier et al. .......... 385/135 |
| 6,968,111 B1 | * | 11/2005 | Trebesch et al. ............ 385/135 |

FOREIGN PATENT DOCUMENTS

| DE | 3542724 C2 | 6/1987 |
| EP | 0645657 B1 | 9/2004 |

* cited by examiner

*Primary Examiner*—Frank G. Font
*Assistant Examiner*—Derek L. Dupuis

(57) ABSTRACT

The invention relates to a splicing cassette management system for an optical waveguide distribution cabinet. The splicing cassette management system includes a plurality of splicing cassettes (21), arranged in a splicing cassette holder (20). The splicing cassette holder (20) is arranged on a pull-out mounting device (18) and may be moved together with the mounting device (18) into a first plane, whereby the splicing cassette holder (20) may be rotated from the first plane into a second plane, which is approximately perpendicular to the first plane.

6 Claims, 4 Drawing Sheets

SPLICING CASSETTE MANAGEMENT SYSTEM

This application is a National application claiming priority to International Application No. PCT/EP02/13421, filed on Nov. 28, 2002, which claims priority to German Patent Application No. 20200065.6, filed on Jan. 3, 2002. The International Application was published on Jul. 10, 2003 (WO 03/056375 A2) pursuant to PCT Article 21(2) in the German language.

FIELD OF THE INVENTION

The invention relates to a splicing cassette management system for an optical waveguide distribution cabinet.

BACKGROUND OF THE INVENTION

Distribution cabinets are required in order to ensure structured wiring for the construction of optical waveguide cable networks. Splicing cassettes are subunits of distribution cabinets. One requirement to which optical waveguide distribution cabinets are subject is that the maximum number of components and wiring can be fitted with a high packing density.

The present-day standard for optical waveguide distribution cabinets is based on so-called 19-inch distribution cabinets with a physical depth of 600 millimeters. If the physical depth of the distribution cabinet needs to be reduced, for example to a physical depth of 300 millimeters, then problems occur with the structured wiring, in particular with regard to arranging the splicing cassettes in a space-saving manner in the distribution cabinet.

Against this background, the present invention is based on the problem of providing a novel splicing cassette management system for an optical waveguide distribution cabinet, which allows structured wiring even when the physical depth of the distribution cabinet is reduced.

This problem is solved by a splicing cassette management system for an optical waveguide distribution cabinet having the features shown and described herein.

BRIEF DESCRIPTION OF THE DRAWINGS

Preferred developments of the invention can be found in the dependent claims and in the following description. One exemplary embodiment will be explained in more detail with reference to the accompanying drawings, in which:

DETAILED DESCRIPTION OF THE INVENTION

Figure 1:
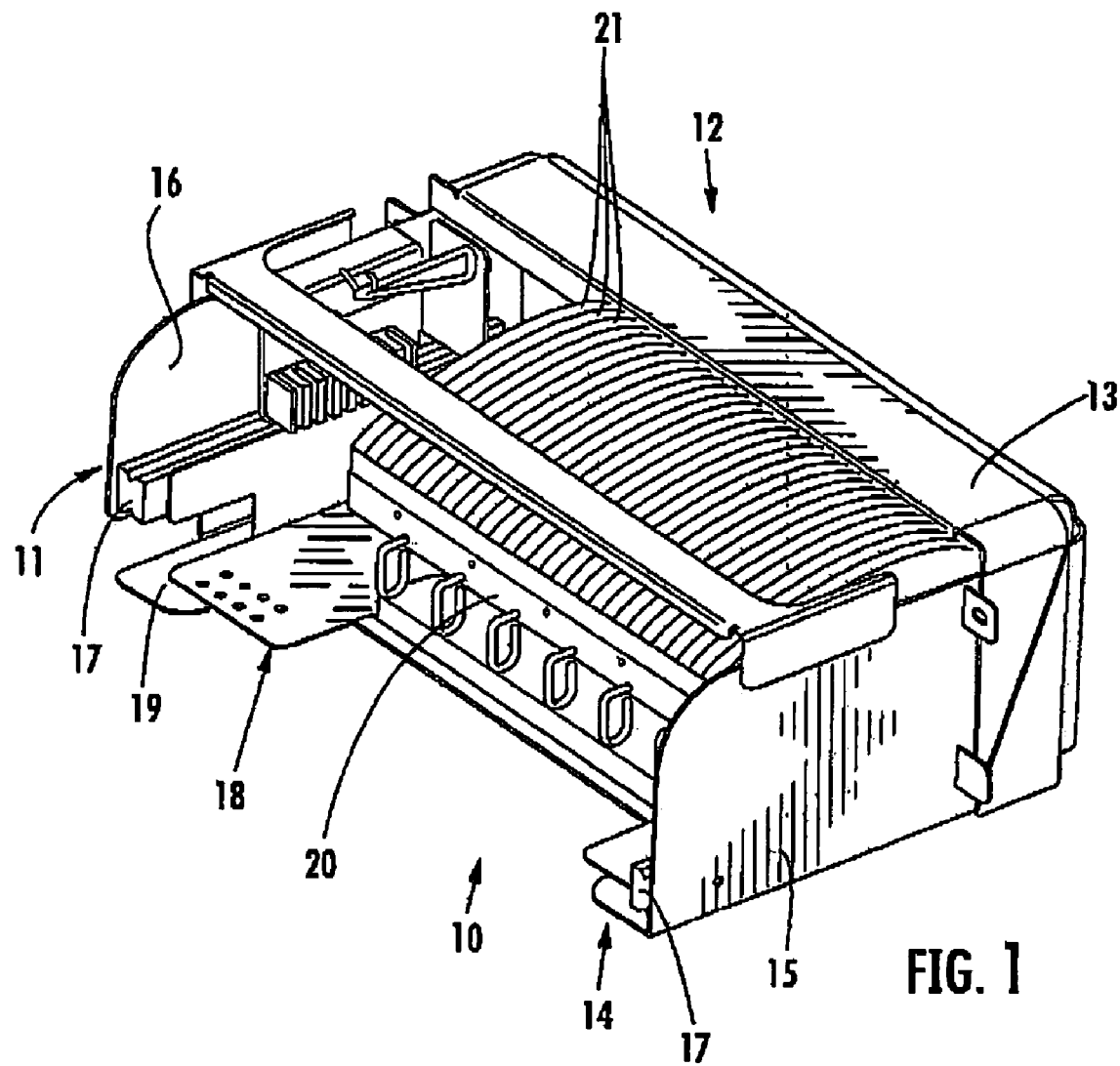
FIG. 1 shows a perspective side view of a splicing cassette management system according to the invention for an optical waveguide distribution cabinet.
Figure 2:
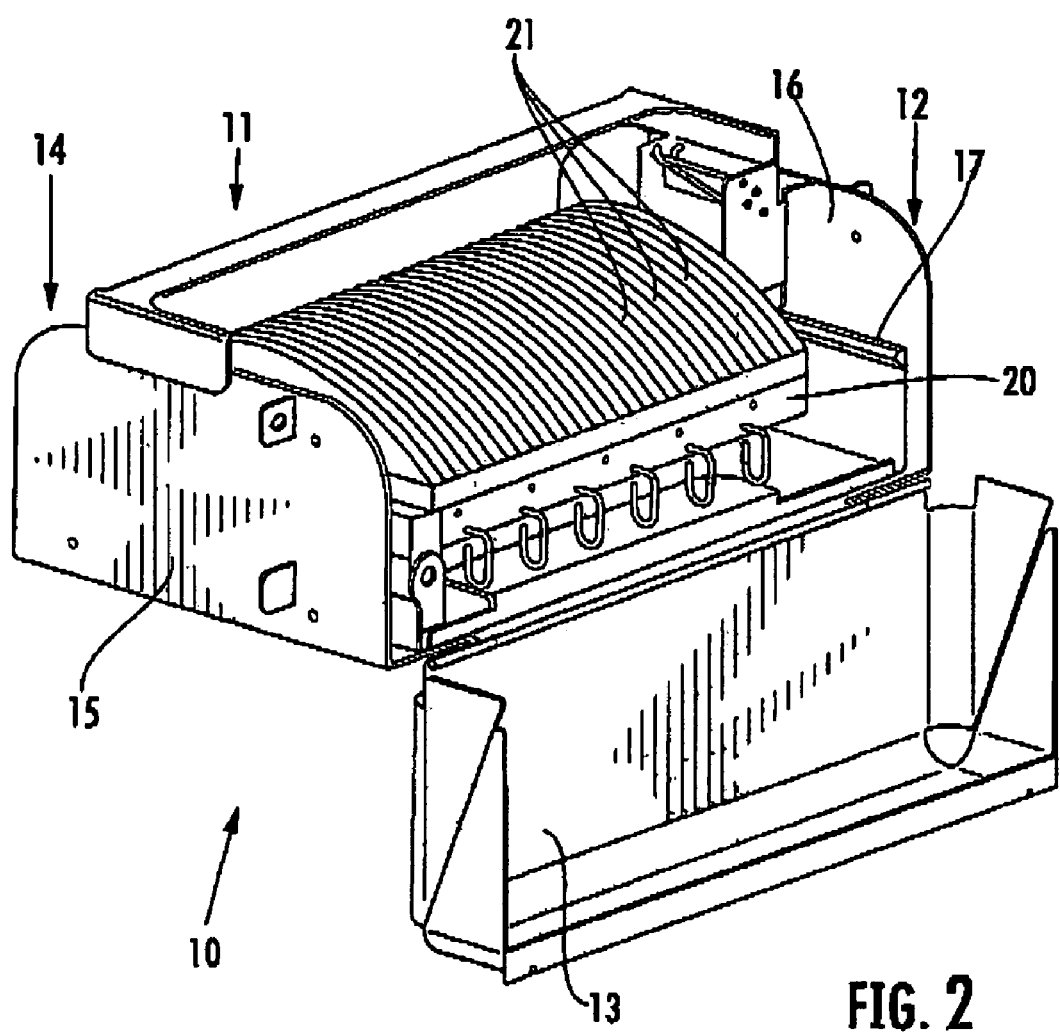
FIG. 2 shows a splicing cassette management system as shown in FIG. 1, with a covering flap which can be folded open.

The splicing cassette management system 10 according to the invention and as shown in FIGS. 1 to 4 has a housing 11, with the housing 11 being bounded by a covering flap 13 on its front face 12. In the illustrated exemplary embodiment, there is no such covering flap on a rear face 14 of the housing 11, opposite the front face 12.

Guide rails 17 are mounted on side walls 15, 16 of the housing 11. A mounting device 18, which is in the form of a drawer, is mounted and guided in the guide rails 17 such that it can be moved backward and forward. The mounting device 18, which is in the form of a drawer, can in this way be moved on a first plane in a direction which is predetermined by the guide rails 17, specifically parallel to a base wall 19 of the housing 11.

A splicing cassette holder 20 is positioned in the mounting device 18 of the splicing cassette management system 10. The splicing cassette holder 20 holds two or more splicing cassettes 21, which run approximately parallel to one another. The splicing cassette holder 20 can accordingly be moved on the first plane, together with the mounting device 18.

Figure 3:
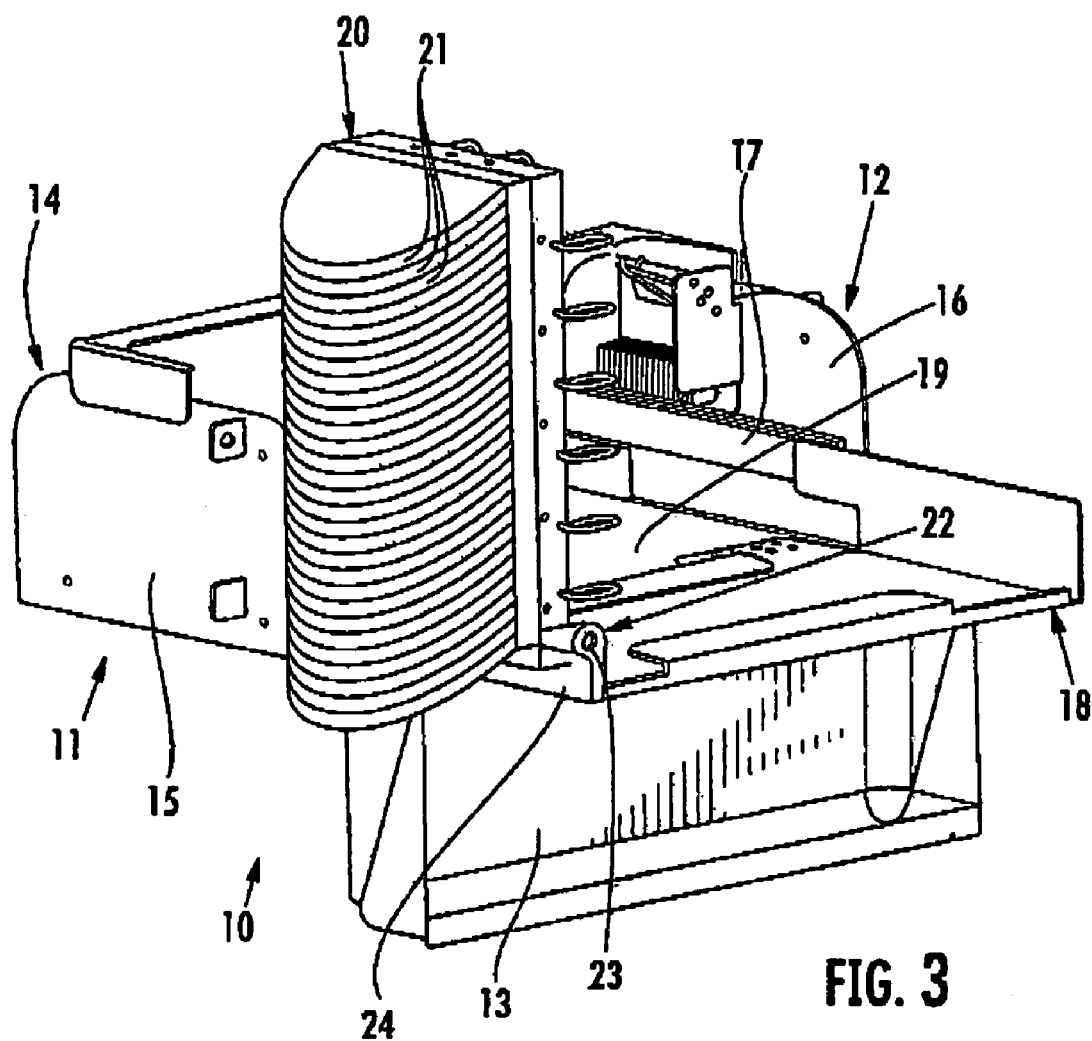
FIG. 3 shows the splicing cassette management system as shown in FIG. 1 with the covering flap unfolded, with a drawer which has been withdrawn from the front face and with the splicing cassette holder raised.
Figure 4:
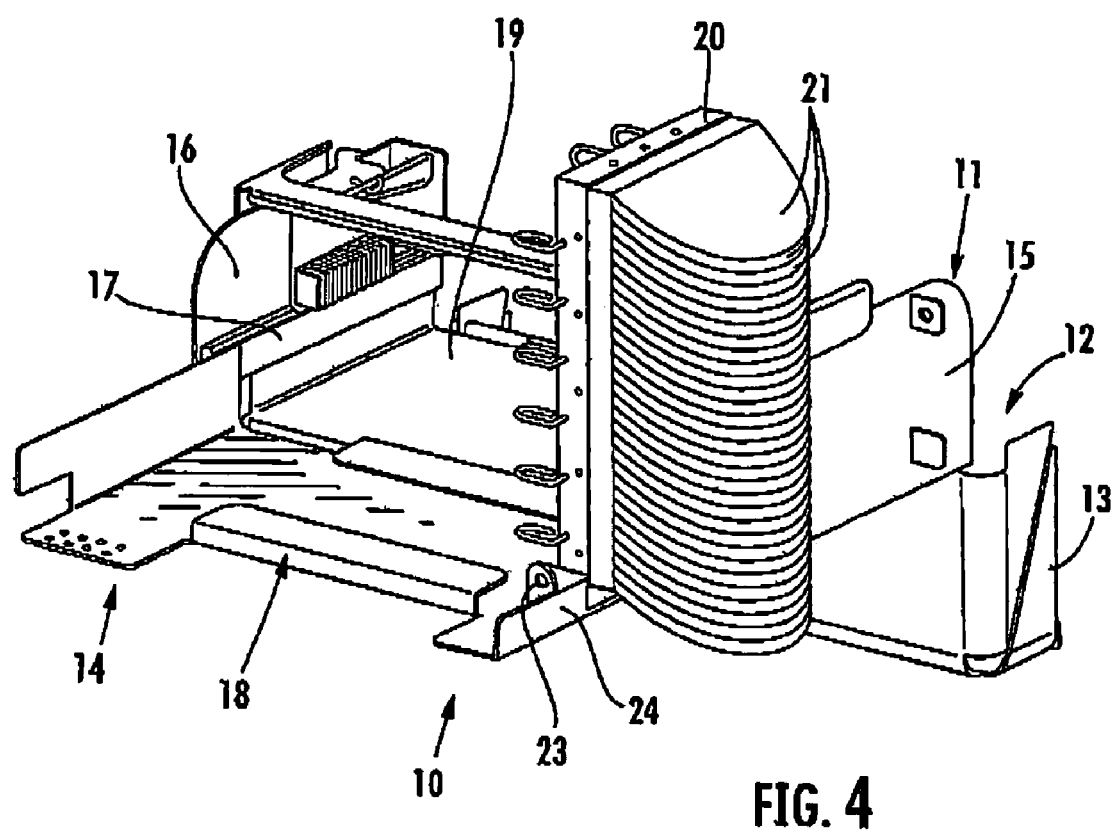
FIG. 4 shows the splicing cassette management system as shown in FIG. 1 with the covering flap unfolded, with the drawer withdrawn from the rear face, and with the splicing cassette holder raised.

The mounting device 18 is in this case designed such that it can be moved out of the splicing cassette management system, together with the splicing cassette holder 20, both from the front face 12 and from the rear face 14. FIG. 3 shows the splicing cassette management system 10 with the covering flap 13 folded open and with the mounting device 18 pushed out of the front face 12 of the splicing cassette management system 10. FIG. 4 shows the splicing cassette management system 10 with the mounting device 18 pushed out of its rear face.

According to the invention, the splicing cassette holder 20 can not only be moved backward and forward together with the mounting device 18 on the first plane, which runs parallel to the base wall 19 of the splicing cassette management system 10, but can also be folded from the first plane to a second plane which runs approximately at right angles to the first plane. For this purpose, the splicing cassette holder 20 has an associated pivoting device 23 on one of its faces 22. The splicing cassette holder 20 is attached to the mounting device 18 via the pivoting device 23. As can be seen in particular from FIGS. 3 and 4, this pivoting device 23 is associated with one side wall 24 of the mounting device 18. In order to fold the splicing cassette holder 20 from the first plane to the second plane, the splicing cassette holder 20 is pivoted through 90° about a rotation axis of the pivoting device 23 which extends approximately parallel to the side wall 24 of the mounting device 18. The side wall 24 then forms a stop and a support for the splicing cassette holder once it has been pivoted to the second plane. The pivoting device 23 is preferably in the form of a latching joint, with the splicing cassette holder 20 being pivoted to the plane of the mounting device 18 in a first latching step, and being pivoted from this first plane to the second plane in a second latching step.

The splicing cassette management system 10 according to the invention can be used to position the splicing cassettes 21 and the splicing cassette holder 20 in the distribution cabinet in a particularly space-saving manner. This allows high packing densities to be achieved in the optical waveguide distribution cabinet.

All that is required to access the optical waveguides that are placed in the splicing cassettes 21 is to move the splicing cassette holder 20 together with the mounting device 18 out of the housing 11 on one side of the splicing cassette management system 10, and then to pivot it to the second plane.

LIST OF REFERENCE SYMBOLS

10 Splicing cassette management system
11 Housing
12 Front face
13 Covering flap
14 Rear face
15 Side wall
16 Side wall
17 Guide rail
18 Mounting device
19 Base wall
20 Splicing cassette holder
21 Splicing cassette
22 Face
23 Pivoting device
24 Side wall That which is claimed is:

1. A splicing cassette management system for an optical waveguide distribution cabinet, comprising two or more splicing cassettes rotatably mounted on a splicing cassette holder that is pivotably mounted on a linearly movable mounting device such that the splicing cassette holder and the splicing cassettes can be moved together with the mounting device on a first plane, and the splicing cassette holder and the splicing cassettes can be pivoted together relative to the mounting device from the first plane to a second plane.

2. The splicing cassette management system as claimed in claim 1, wherein the second plane is approximately at a right angle to the first plane.

3. The splicing cassette management system as claimed in claim 1, wherein the mounting device is mounted in a housing via guide rails, and wherein the splicing cassette holder can be withdrawn from the housing together with the mounting device via the guide rails on two opposite sides of the housing.

4. The splicing cassette management system as claimed in claim 3, wherein the mounting device is in the form of a drawer.

5. The splicing cassette management system as claimed in claim 1, wherein the splicing cassette holder has a pivoting device and wherein the splicing cassette holder is mounted on the mounting device via the pivoting device and is rotatable from the first plane to the second plane.

6. The splicing cassette management system as claimed in claim 5, wherein the pivoting device is in the form of a latching joint.

* * * * *